United States Patent
Hetrick

(10) Patent No.: US 7,149,846 B2
(45) Date of Patent: Dec. 12, 2006

(54) RAID PROTECTED EXTERNAL SECONDARY MEMORY

(75) Inventor: William A. Hetrick, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 270 days.

(21) Appl. No.: 10/124,647

(22) Filed: Apr. 17, 2002

(65) Prior Publication Data

US 2003/0200388 A1 Oct. 23, 2003

(51) Int. Cl.
*G06F 12/16* (2006.01)

(52) U.S. Cl. ............... 711/114; 711/154; 711/161; 711/162

(58) Field of Classification Search ........ 711/112–114, 711/124, 104, 105
See application file for complete search history.

(56) References Cited

U.S. PATENT DOCUMENTS

| | | | | |
|---|---|---|---|---|
| 5,734,859 | A * | 3/1998 | Yorimitsu et al. | 711/112 |
| 5,754,753 | A * | 5/1998 | Smelser | 714/8 |
| 5,805,787 | A * | 9/1998 | Brant et al. | 714/6 |
| 5,835,940 | A * | 11/1998 | Yorimitsu et al. | 711/112 |
| 5,974,503 | A * | 10/1999 | Venkatesh et al. | 711/114 |
| 6,321,298 | B1 * | 11/2001 | Hubis | 711/124 |
| 6,330,642 | B1 * | 12/2001 | Carteau | 711/114 |
| 6,507,890 | B1 * | 1/2003 | Morley et al. | 711/114 |
| 6,567,889 | B1 * | 5/2003 | DeKoning et al. | 711/114 |
| 6,615,313 | B1 * | 9/2003 | Kato et al. | 711/113 |

OTHER PUBLICATIONS

"Memory Management for All of Us", Goodman, SAMS, 1992, pp. 513-515.

* cited by examiner

*Primary Examiner*—T Nguyen
(74) *Attorney, Agent, or Firm*—Yee & Associates, P.C.

(57) ABSTRACT

A redundant array of solid state disk drives is provided among the storage devices controlled by a storage controller. The solid state disk drives may serve as a level 2 cache using standard multi-level cache management algorithms. The solid state disks may share a drive channel with other storage devices or may have a dedicated channel. Multiple solid state disk devices may also be provided to avoid single points of failure. With two solid state disks, the storage processor could maintain the cache data in both devices. If one device fails, the other could be used to maintain data services. With two or more devices, other Redundant Array of Independent Disks organizations may be used to improve data-to-metadata ratio while maintaining fault tolerance. Using these Redundant Array of Independent Disks techniques, the plurality of solid state disks may then be organized as a single level 2 cache volume that serves as a second level cache for a storage controller.

23 Claims, 5 Drawing Sheets

RAID PROTECTED EXTERNAL SECONDARY MEMORY

RELATED APPLICATIONS

The present application is related to commonly assigned and co-pending U.S. patent application Ser. No. 10/100,150 entitled "METHOD AND APPARATUS FOR USING A SOLID STATE DISK DEVICE AS A STORAGE CONTROLLER CACHE", filed on Mar. 18, 2002, and hereby incorporated by reference.

BACKGROUND OF THE INVENTION

1. Technical Field

The present invention relates to data storage and, in particular, to data cache in a storage controller. Still more particularly, the present invention provides a method and apparatus for using a redundant array of solid state disks as level 2 cache in a storage controller.

2. Description of the Related Art

A storage controller is an embedded system logically connected between a host computer system and a pool of storage. FIG. 1 illustrates an example of a typical storage controller system. Input/output (I/O) host 102 sends read and write data access requests to storage module 110. The storage module includes storage controller 120 and disk drives 130. Storage controller 120 performs read and write operations to satisfy the data access requests of the I/O host.

Storage controller 120 includes I/O cache 122. This I/O cache, also referred to as storage controller level 1 cache, is located in the storage controller memory. Data blocks that are read from disk drives 0–N may be stored in the I/O cache so that frequently accessed data may be read from the faster memory device rather than the slower disk drives. Furthermore, I/O cache 122 may also serve as intermediate storage for data blocks that are written to the disk drives. Subsequent reads of these data blocks may be found in the cache, thus reducing access time.

Still further, each one of level 1 and level 2 cache memories is a single point of failure. Thus, a cache may appear as a weakness in system reliability. If the cache memory fails or communication error prevents access to the cache memory, data can either be lost or inaccessible. Data unavailability is perceived as a failure.

More particularly, redundant array of independent disks (RAID) systems, may stripe data blocks and store each stripe on a different physical disk drive. For example, in the storage controller system shown in FIG. 1, a data block written to storage module 110 may be striped into N+1 stripes, each stripe being stored on a respective one of drives 0–N 130. With the greater number of reads and writes to physical drives in RAID systems, the importance of I/O cache is increased. While a RAID system can improve the performance and reliability of the hard disks themselves, RAID does not affect the performance or dependability of the cache.

Therefore, it would be advantageous to provide an improved multi-level cache for storage controller systems.

SUMMARY OF THE INVENTION

The present invention provides a redundant array of solid state disk drives among the storage devices controlled by a storage controller. The solid state disk drives may serve as a level 2 cache using standard multi-level cache management algorithms. The solid state disks may share a drive channel with other storage devices or may have a dedicated channel. The present invention may also provide multiple solid state disk devices to avoid single points of failure. With two solid state disks, the storage processor could maintain the cache data in both devices. If one device fails, the other could be used to maintain data services. With two or more devices, other Redundant Array of Independent Disks organizations may be used to improve data-to-metadata ratio while maintaining fault tolerance. Using these Redundant Array of Independent Disks techniques, the plurality of solid state disks may then be organized as a single level 2 cache volume that serves as a second level cache for a storage controller.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION

The description of the preferred embodiment of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention the practical application to enable others of ordinary skill in the art to understand the invention for various embodiments with various modifications as are suited to the particular use contemplated.

Figure 1:
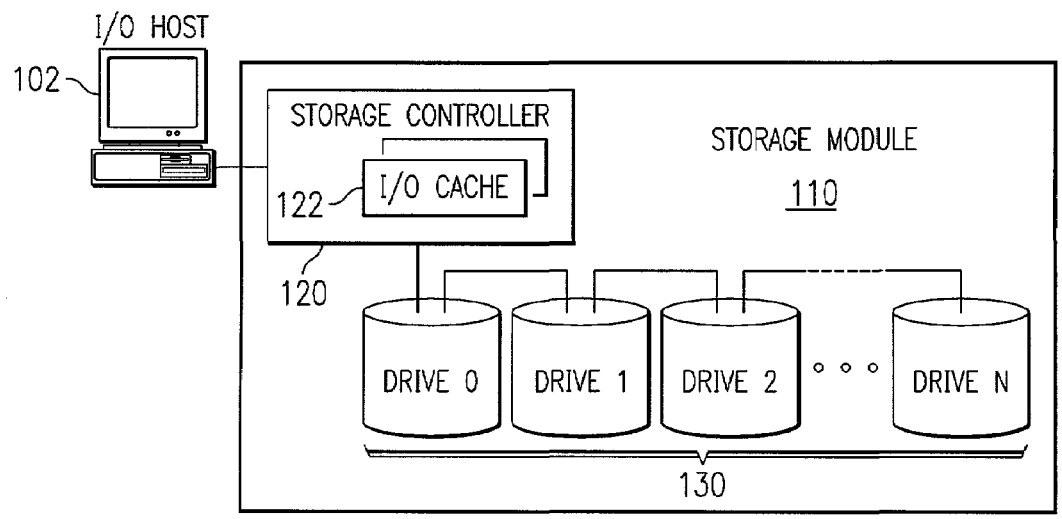
FIG. 1 illustrates an example of a typical storage controller system.
Figure 2:
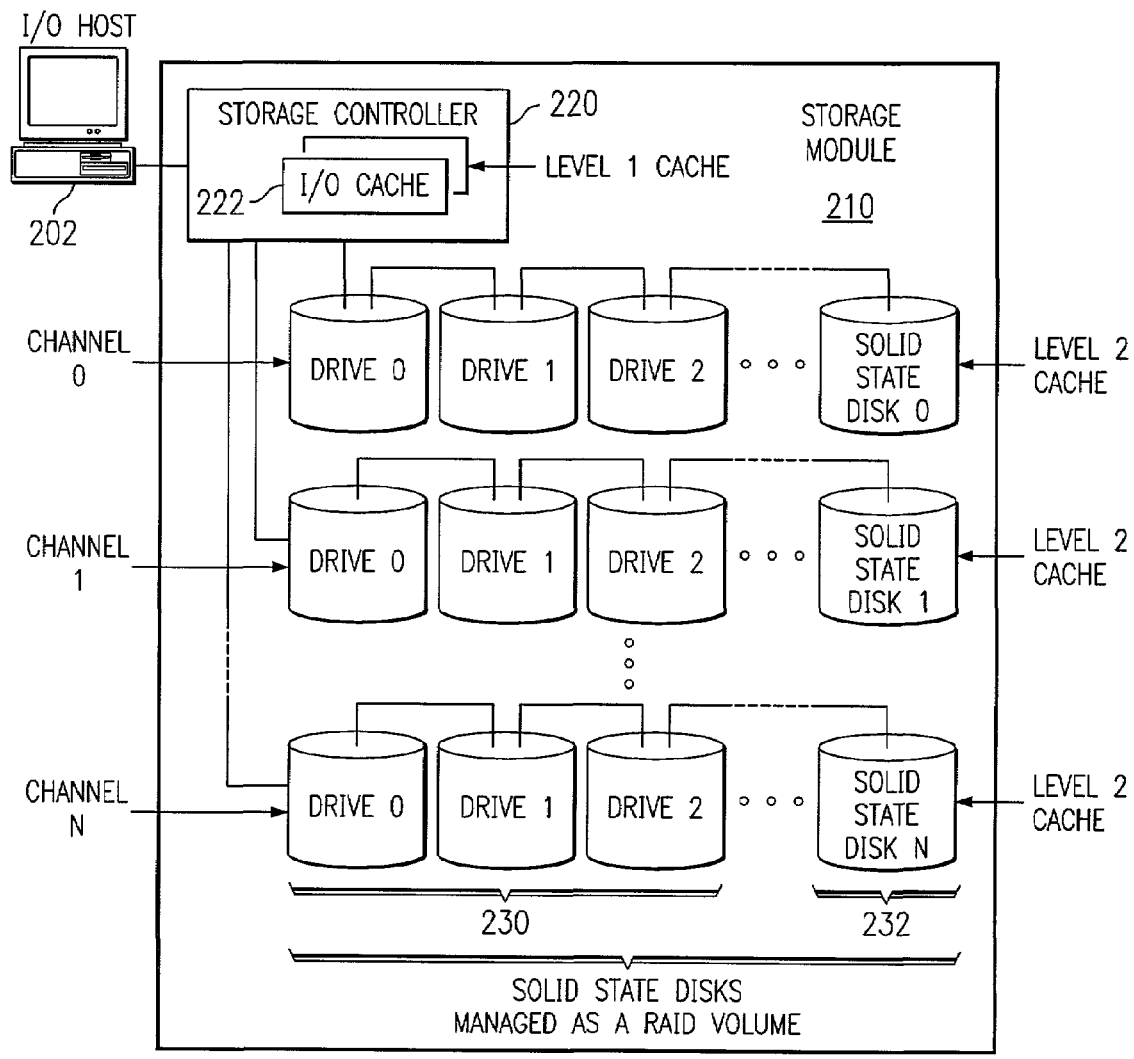
FIG. 2 illustrates an example of a storage controller system in accordance with a preferred embodiment of the present invention.

With reference now to the figures and in particular with reference to FIG. 2, a storage controller system is illustrated in accordance with a preferred embodiment of the present invention. Input/output (I/O) host 202 sends read and write data access requests to storage module 210. The storage module includes storage controller 220 and disk drives 230. Storage controller 220 performs read and write operations to satisfy the data access requests of the I/O host. Disk drives 230 may be connected to the storage controller via channels 0–N.

The depicted example illustrated in FIG. 2 and above-described examples are not meant to imply architectural limitations. For example, drives 230 may be hard disk drives. However, other storage devices, such as tape drives, optical disk drives, and the like, may be used in addition to or in place of the hardware shown in FIG. 2.

Storage controller 220 includes I/O cache 222, which serves as the storage controller level 1 (L1) cache. I/O cache 222 may be a random access memory (RAM). A typical example of a storage controller system may allocate 1 GB of memory for storage controller level 1 cache; however, more or less memory may be allocated for cache depending on the implementation.

Advances in memory technologies have led to the emergence of solid state disks. Solid state disk devices are essentially a non-volatile random access memory connected to an I/O channel. Due to the I/O channel protocol, memory access is not as fast for solid state disks as it is for the memory on the storage controller. However, the underlying random access memory generally has much improved I/O latency, I/O rate and sustained bandwidth as compared to hard disk drives.

In accordance with a preferred embodiment of the present invention, drives 230 also include solid state disk drive 232, which serves as the storage controller level 2 cache. With the improved performance characteristics of solid state disks over hard disk drives, solid state disk drive 232 may be used as a second level cache by a storage processor using standard multi-level cache management algorithms.

To make use of external, high-performance devices such as solid-state disks as secondary I/O cache, the present invention uses Redundant Array of Independent Disks (RAID) techniques to improve the performance and reliability of the level 2 cache. For example, storage module 210 may include multiple solid state disk devices 232 to avoid single points of failure. With two solid state disk devices, storage controller 220 could maintain the same data in both devices. If one solid state disk failed, the other could be used to maintain data services. This configuration is referred to as RAID 1 (mirroring). With two or more solid state disk devices, other RAID organizations, such as striped parity (RAID 5), may also be used to improve the data to metadata ratio while maintaining fault tolerance.

Figure 3A:
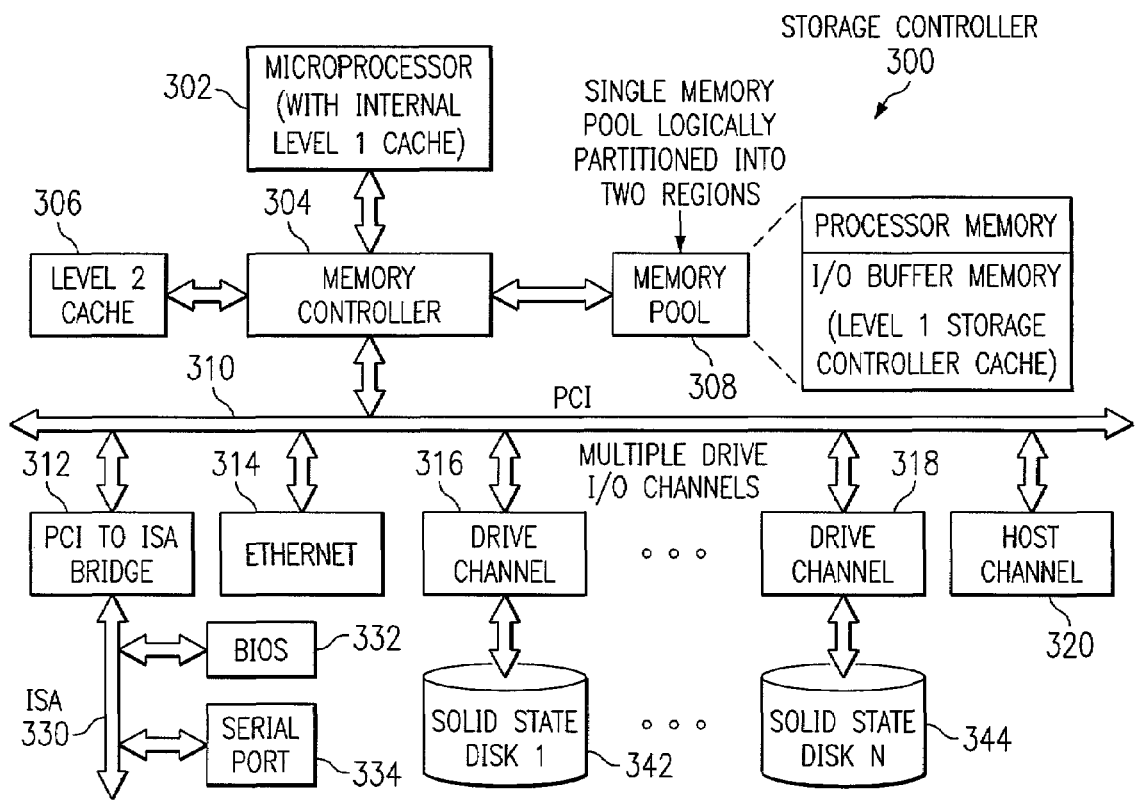
FIGS. 3A and 3B are block diagrams illustrating example storage controller architectures in accordance with a preferred embodiment of the present invention.
Figure 3B:
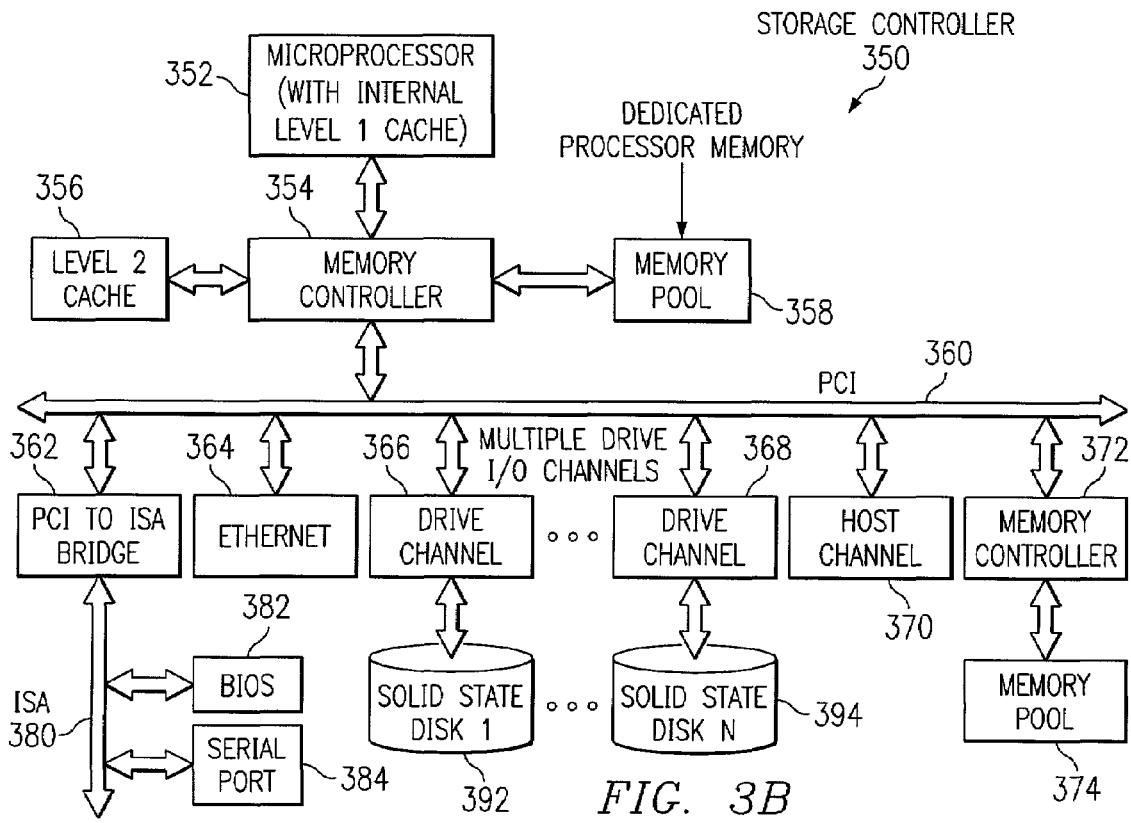

With reference now to FIGS. 3A and 3B, block diagrams are shown illustrating example storage controller architectures in accordance with a preferred embodiment of the present invention. Particularly, FIG. 3A illustrates a single-memory storage controller architecture. Storage controller 300 employs a peripheral component interconnect (PCI) local bus architecture. Although the depicted example employs a PCI bus, other bus architectures such as Industry Standard Architecture (ISA) may be used. Microprocessor 302, with internal level 1 cache, and memory pool 308 are connected to PCI local bus 310 through memory controller 304. Microprocessor level 2 cache 306 is also connected to memory controller 304. PCI bridge 310 also may include an integrated memory controller and cache memory for processor 302.

In the depicted example, ethernet adapter 314, PCI to ISA bridge 312, drive channel adapters 316–318, and host channel adapter 320 are connected to PCI bus 310 by direct component connection. PCI to ISA Bridge 312 provides a connection through ISA bus 330 for basic input output system (BIOS) 332 and serial port 324.

Processor 302 is used to coordinate and provide control of various components within storage controller 300 in FIG. 3A. Instructions for the storage controller may be located on storage devices, such as BIOS 322, and may be loaded into memory pool 308 for execution by processor 302.

Memory pool 308 is a single memory pool that is logically partitioned into two regions. A first region serves as processor memory. This portion of memory is used by processor 302, for example, as "scratch pad" memory to perform the operations of the storage controller. The second region of memory pool 308 serves as I/O buffer memory or level 1 storage controller cache.

Drive channel adapters 316–318 provide drive channels for storage devices, such as hard disk drives. A storage controller may have, for example, four drive channels. Each drive channel may support multiple drives per channel. The number of drives is limited by I/O hardware and communication protocol.

In accordance with a preferred embodiment of the present invention, solid state disks 342, 344 are connected to at least one of the drive channel adapters, such as drive channel adapters 316, 318 in FIG. 3A. Solid state disks 342, 344 form a storage controller level 2 cache volume that is used to supplement the level 1 cache stored in memory pool 308. Each solid state disk may store, for example, 8 GB of data. Therefore, read request performance may be greatly improved due to an increased probability of the data residing either in the storage controller level 1 cache or the high-speed solid state disk.

Performance and reliability may also be improved by using RAID storage configurations. For example, data may be striped (RAID 0) across solid state disks 1–N. As another example, data stored on one solid state disk, such as disk 342, may be mirrored (RAID 1) on another solid state disk, such as disk 344. A combination of RAID 0 and RAID 1, referred to as RAID 1,0 or RAID 10, can also be used to stripe and mirror cache data stored on solid state disks 1–N. Further, one solid state disk may be used to store parity data (RAID 3) for the other solid state disks. Still further, cache data and parity data may be striped across three or more drives for performance and fault tolerance (RAID 5). Other RAID techniques may also be used to manage the second level cache volume stored on solid state disks 342, 344.

Turning now to FIG. 3B, a dual-memory storage controller architecture is shown in accordance with a preferred embodiment of the present invention. Storage controller 350 employs a peripheral component interconnect (PCI) local bus architecture. Although the depicted example employs a PCI bus, other bus architectures such as Industry Standard Architecture (ISA) may be used. Microprocessor 352, with internal level 1 cache, and memory pool 358 are connected to PCI local bus 360 through memory controller 354. Microprocessor level 2 cache 356 is also connected to memory controller 354. PCI bridge 360 also may include an integrated memory controller and cache memory for processor 352.

In the depicted example, Ethernet adapter 364, PCI to ISA bridge 362, drive channel adapters 366–368, and host channel adapter 370 are connected to PCI bus 360 by direct component connection. PCI to ISA Bridge 362 provides a connection through ISA bus 380 for basic input output system (BIOS) 382 and serial port 384.

Processor 352 is used to coordinate and provide control of various components within storage controller 350 in FIG. 3B. Instructions for the storage controller may be located on storage devices, such as BIOS 382, and may be loaded into memory pool 358 for execution by processor 352.

Processor 352 uses memory pool 358, for example, as a "scratch pad" memory to perform the operations of the storage controller. Memory pool 374 is connected to PCI bus 360 by memory controller 372. Memory pool 374 serves as I/O buffer memory or level 1 storage controller cache.

Drive channel adapters 366–368 provide drive channels for storage devices, such as hard disk drives. In accordance with a preferred embodiment of the present invention, solid state disks 392, 394 are connected to drive channel adapters, such as drive channel adapters 366, 368 in FIG. 3B. Solid state disks 392, 394 form a cache volume that serves as storage controller level 2 cache to supplement the level 1 cache stored in memory pool 374. Each solid state disk may store, for example, 8 GB of data. Therefore, read request performance may be greatly improved due to an increased probability of the data residing either in the storage controller level 1 cache or the high-speed solid state disk. Performance and reliability may also be improved by using RAID storage configurations as discussed above with respect to FIG. 3A.

Those of ordinary skill in the art will appreciate that the hardware in FIGS. 3A and 3B may vary depending on the implementation and the depicted examples in FIGS. 3A and 3B and above-described examples are not meant to imply architectural limitations. For example, the examples shown in FIGS. 3A and 3B illustrate bus architectures; however, the present invention may be implemented using other architectures, such as a switched architecture. For example, the present invention may be implemented using a Fibre Channel architecture.

Figure 4A:
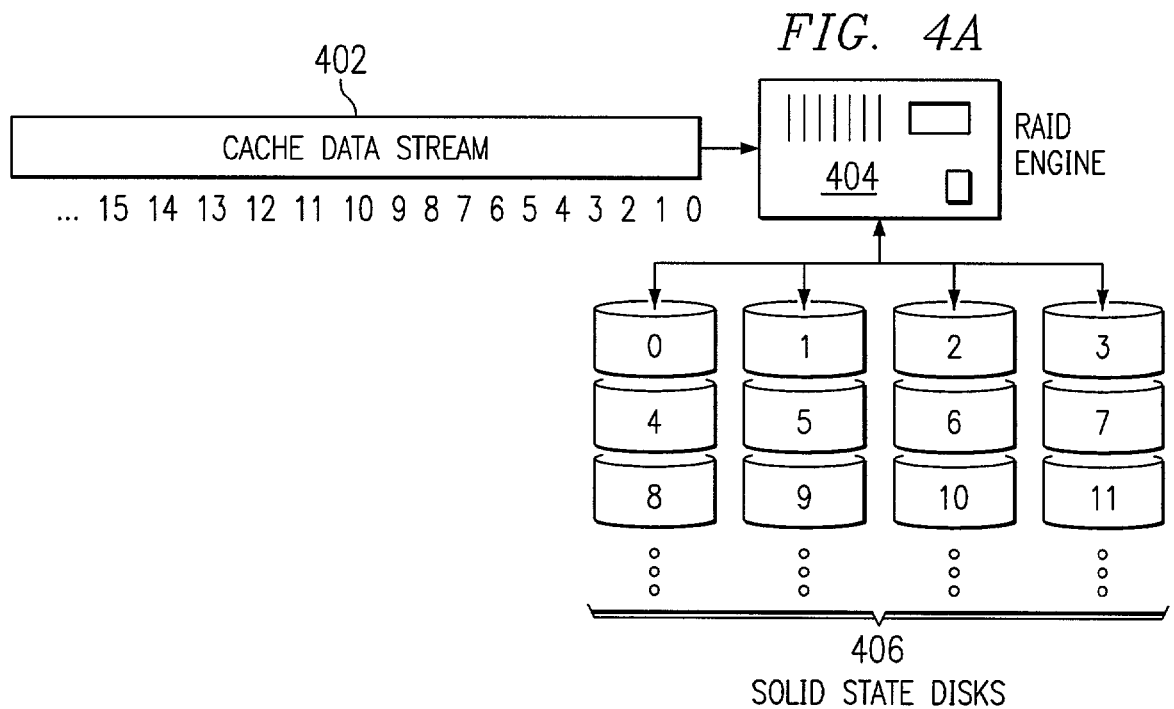
FIGS. 4A–4D illustrate example RAID configurations using solid state disks to implement a storage controller cache in accordance with a preferred embodiment of the present invention.

With reference to FIGS. 4A–4D, example RAID configurations using solid state disks to implement a storage controller cache are depicted in accordance with a preferred embodiment of the present invention. More particularly, FIG. 4A illustrates an example RAID 0 configuration. Cache data stream 402 is received by RAID engine 404. The RAID engine manages the storage of the cache data stream onto solid state disks 406. Rather than storing the cache data on a single solid state disk, RAID engine stripes the data across the plurality of solid state disks. While this configuration may result in a slight increase in performance due to parallel reads to and/or writes to the disks, RAID 0 does not enhance reliability. Thus, the increased cost for the plurality of solid state disks will likely outweigh the performance benefit.

Figure 4B:
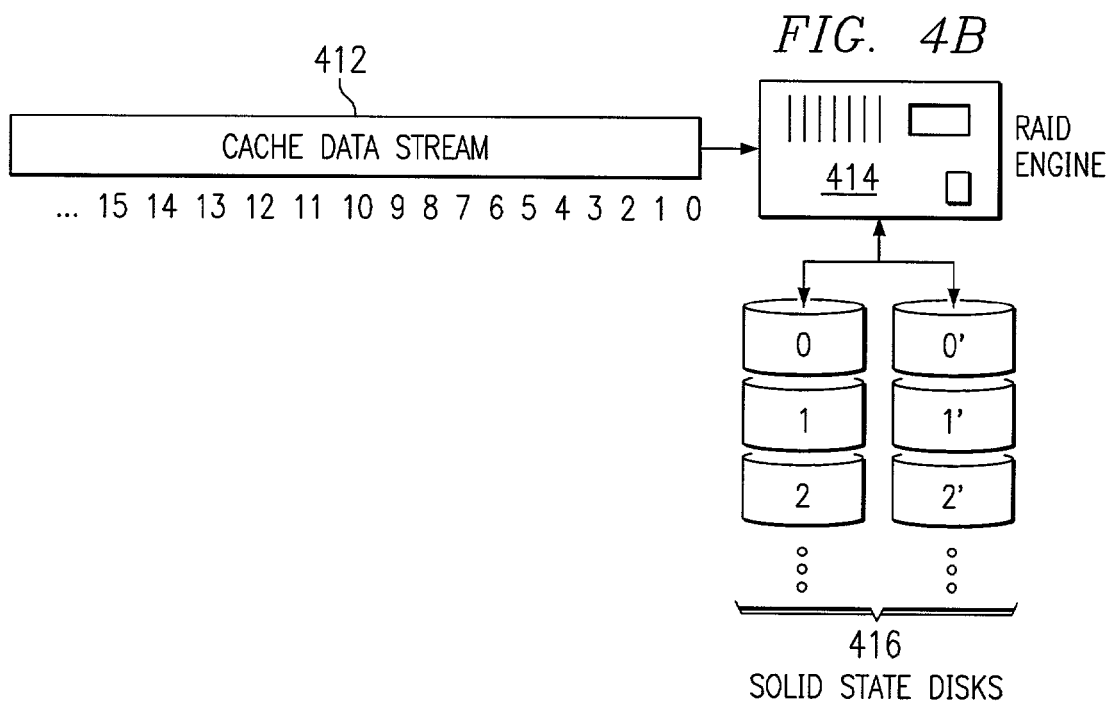

With reference now to FIG. 4B, an example RAID 1 configuration is shown in accordance with a preferred embodiment of the present invention. Cache data stream 412 is received by RAID engine 414. The RAID engine manages the storage of the cache data stream onto solid state disks 416. The RAID engine may store the cache data, for example, on a single solid state disk and mirror or copy that data onto a second solid state disk, as shown in FIG. 4B. If one of the solid state disks fails, the other disk can be used to maintain the second level storage controller cache. A combination of RAID 0 and RAID 1, referred to as RAID 1,0 or RAID 10, can also be used to stripe and mirror cache data stored on solid state disks 416.

Figure 4C:
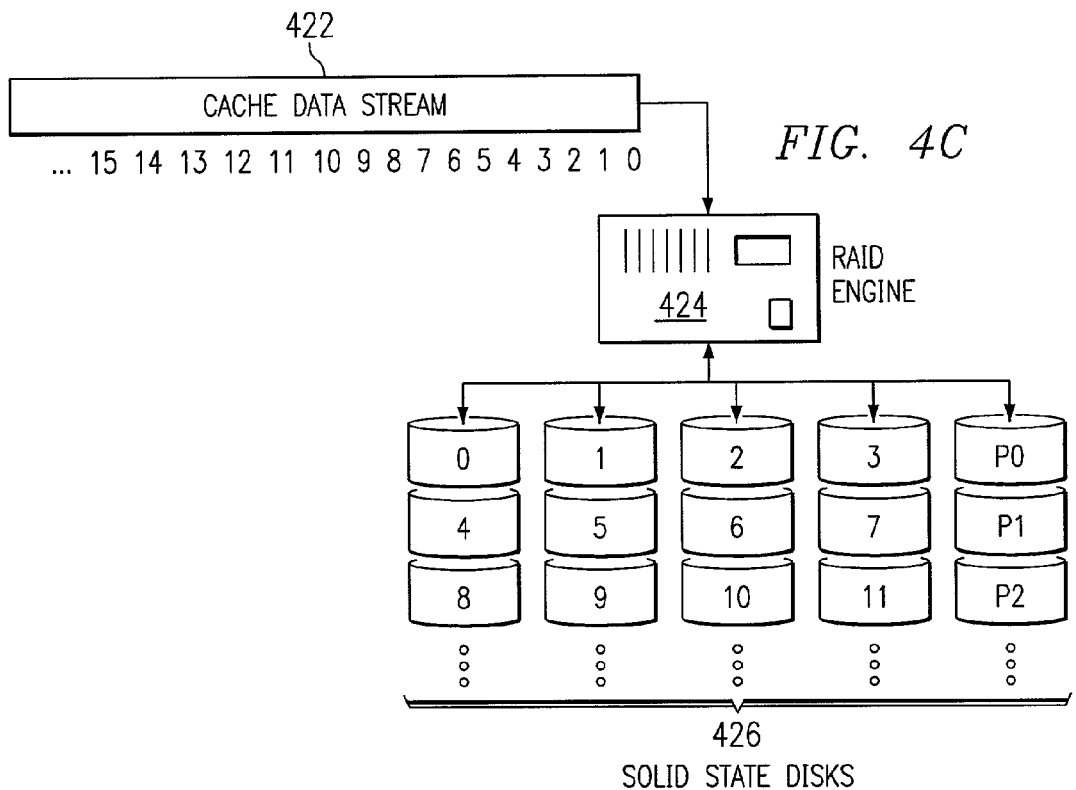

Turning now to FIG. 4C, an example RAID 3 configuration is depicted. Cache data stream 422 is received by RAID engine 424, which manages a cache volume stored on solid state disks 426. The RAID engine stripes the cache data across a plurality of the solid state disks and generates parity data from the striped cache data. The RAID engine stores the parity data on a separate, dedicated solid state disk drive. If a solid state disk fails, the striped data can be reconstructed using the remaining stripes and the parity data. Thus, RAID 3 provides the performance enhancement of RAID 0 and fault tolerance with the dedicated parity disk.

Figure 4D:
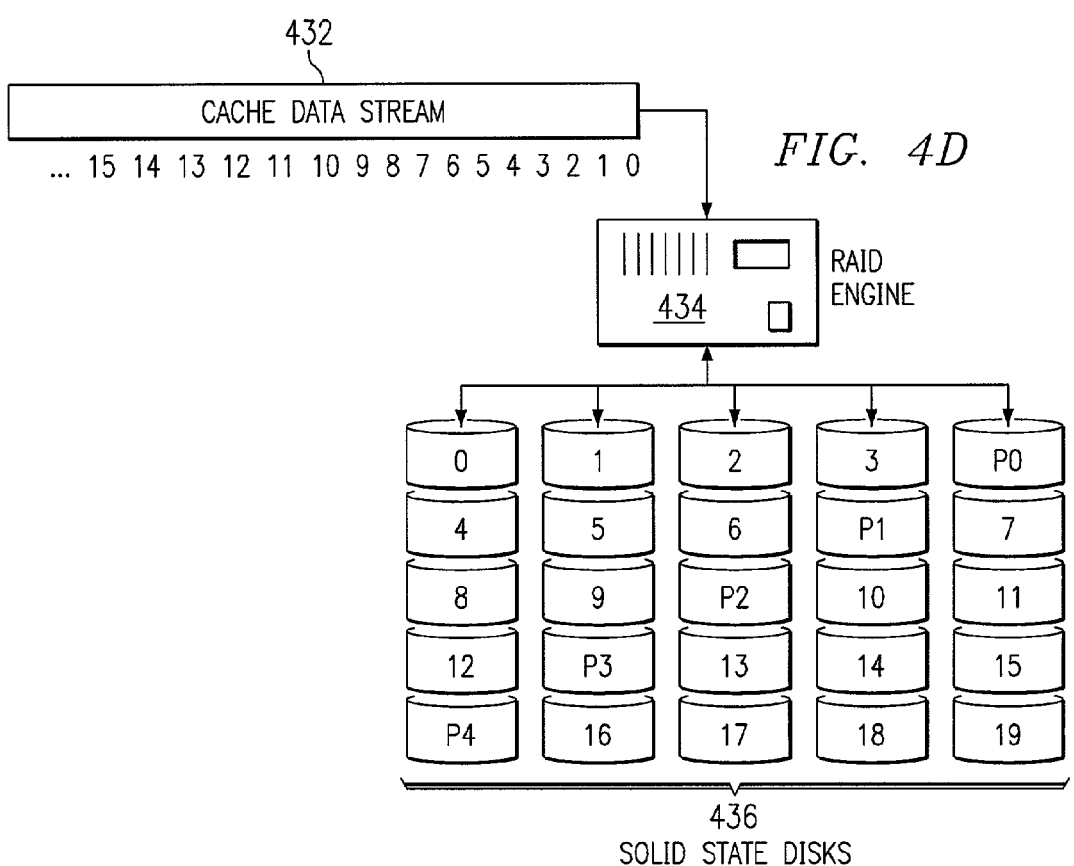

FIG. 4D illustrates an example RAID 5 configuration in accordance with a preferred embodiment of the present invention. Cache data stream 432 is received by RAID engine 434. The RAID engine generates parity data from the cache data and stripes the cache data and the parity data across solid state disks 436. The parity data is interspersed with the striped cache data, as shown by example in FIG. 4D. If a solid state disk fails, the striped data can be reconstructed using the remaining stripes and the parity data. Thus, RAID 5 provides performance enhancement by reading from and writing to all of the solid state disks. Fault tolerance is provided by the parity information.

Other RAID configurations may be used within the scope of the present invention. The examples shown in FIGS. 4A–4D are not meant to imply architectural limitations for the present invention. For example, more or fewer solid state disks may be used depending upon the implementation.

Figure 5:
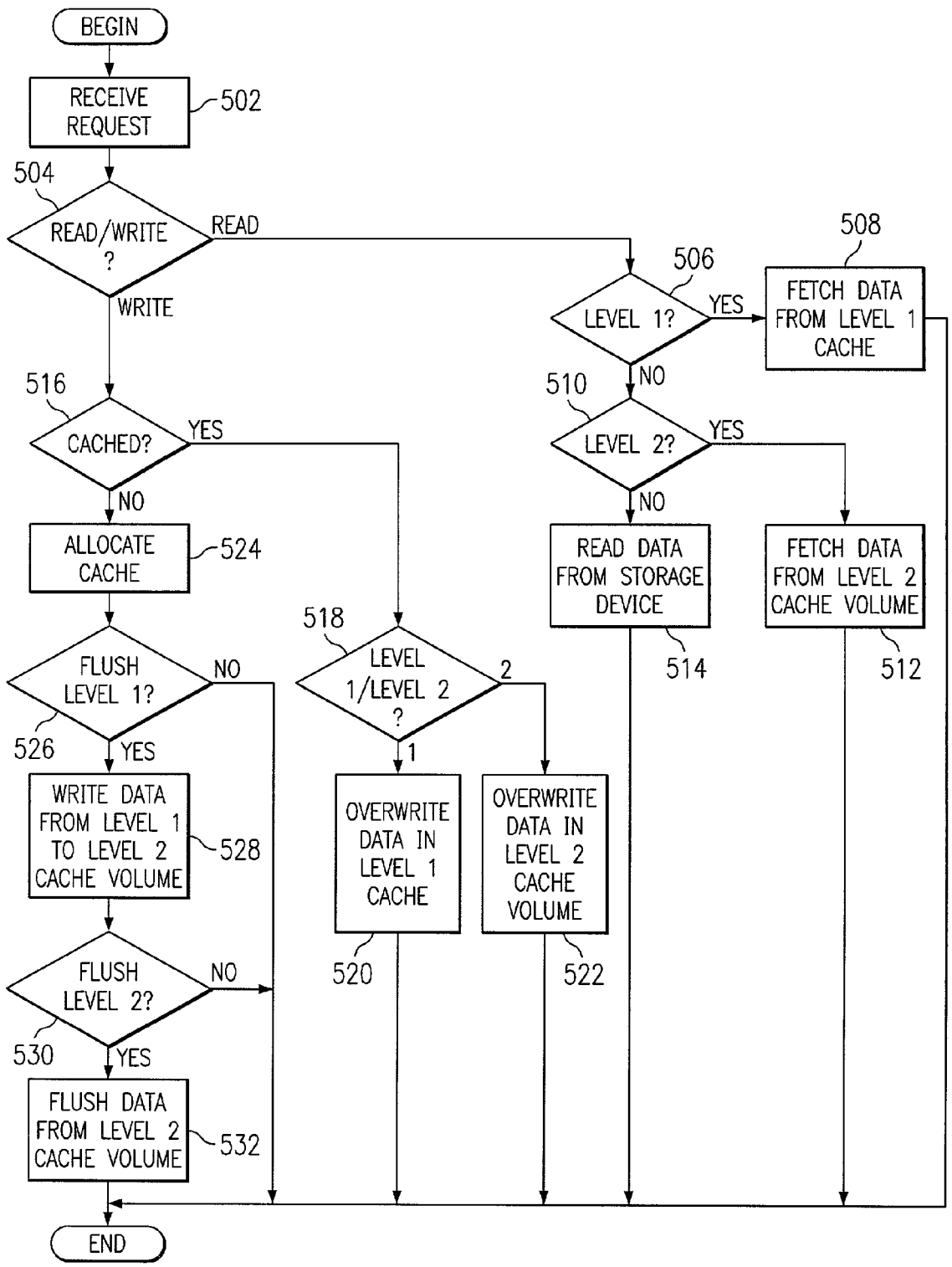
FIG. 5 is a flowchart illustrating the operation of a storage controller in accordance with a preferred embodiment of the present invention.

With reference now to FIG. 5, a flowchart illustrating the operation of a storage controller is shown in accordance with a preferred embodiment of the present invention. The storage controller uses RAID techniques to create a cache volume. The storage controller then may store the cache data across the solid state disks using these RAID techniques according to the following procedure.

The process begins and receives a data access request (step 502). A determination is made as to whether the data access request is a read request or a write request (step 504). If the data access request is a read request, a determination is made as to whether the data is in level 1 cache (step 506). If the data is in level 1 cache, the process fetches the data from level 1 cache (step 508) and the process ends. If the data is not in level 1 cache in step 506, a determination is made as to whether the data is in the level 2 cache stored in the solid state disks (step 510). If the data is stored in the storage controller level 2 cache, the process fetches the data from level 2 cache volume (step 512) and the process ends. However, if the data is not stored in level 2 cache in step 510, the process reads the data from the storage device (step 514) and ends.

Returning to step 504, if the data access request is a write request, a determination is made as to whether the data is cached (step 516). If the data is cached, a determination is made as to whether the data is cached in level 1 cache or level 2 cache (step 518). If the data is cached in level 1 cache, the process overwrites the data in level 1 cache in memory (step 520) and ends. If the data is cached in level 2 cache volume in step 518, the process overwrites the data in the level 2 cache volume (step 522) and the process ends.

If the data is not cached in step 516, the process allocates space in level 1 cache for the written data (step 524). A determination is made as to whether level 1 cache needs to be flushed to make space to cache the written data (step 526). If a flush of level 1 cache is not necessary, the process ends. If, however, a flush of level 1 cache is necessary in step 526, the process writes data from level 1 cache to the level 2 cache volume (step 528) and a determination is made as to whether a flush is necessary to make space to write data in level 2 cache volume (step 530). If a flush is not necessary, the process ends. However, if a flush is necessary in step 530, the process flushes data from level 2 cache volume (step 532) and ends.

Thus, the present invention provides a second level of storage controller cache using a solid state disk device. Read request performance is improved due to an increased probability of data residing in either the storage controller level 1 cache in memory or the solid state disk device. The present invention may also provide multiple solid state disk devices to avoid single points of failure. With two solid state disks, the storage processor could maintain the cache data in both devices. If one device fails, the other could be used to maintain data services. With two or more devices, other RAID organizations may be used to improve data-to-metadata ratio while maintaining fault tolerance. Using these RAID techniques, the plurality of solid state disks may then be organized as a single level 2 cache volume that serves as a second level cache for a storage controller.

Retrieving the data from this second level cache is a less expensive operation than reading the data from the hard disks, especially if the data is striped across several disks as in a RAID storage system. Allowing the volumes to be configured as second level cacheable allows users to tune system performance for specific applications. Solid state disk devices are available in standard hard disk drive form factors. Using these devices as customer replaceable units in hard drive modules allows users to upgrade and expand simply by populating additional units in the system.

What is claimed is:

1. A method for managing a cache in a computer system having a cache residing on a plurality of solid state disks, comprising:
   configuring the plurality of solid state disks to form a cache volume having stored therein a cache;
   receiving a request to access a data block at a storage device, wherein the request to access the data block is a read request;
   accessing the data block in the cache volume, wherein the step of accessing the data block in the cache volume comprises:
      attempting to read at least a portion of the data block from a first solid state disk in the plurality of solid state disks; and
      if the first solid state disks fails, reading the at least a portion of the data black from a second solid state disk in the plurality of solid state disks.

2. The method of claim 1, further comprising, if one of the first solid state disk and the second solid state disk fails, reading parity information from a third solid state disk in the plurality of solid state disks and reconstructing missing data using the parity information.

3. An apparatus for managing a cache in a computer system having a cache residing on a plurality of solid state disks, comprising:
   a processor; and
   a plurality of solid state disks, coupled to the processor, forming a cache volume having stored therein a cache for a redundant array of independent disks,
   wherein the processor is configured to receive a read request to access a data block at a storage device and access the data block in the cache volume,
   wherein the processor accesses the data block in the cache volume by attempting to read at least a portion of the data block from a first solid state disk in the plurality of solid state disks and reading the at least a portion of the data block from a second solid state disk in the plurality of state disks if the first solid state disks fails.

4. The apparatus of claim 3, wherein the processor accesses the data block in the cache volume by reading a first portion of the data block from a first solid state disk in the plurality of solid state disks and reading a second portion of the data block from a second solid state disk in the plurality of solid state disks.

5. The apparatus of claim 4, wherein the processor reads parity information from a third solid state disk in the plurality of solid state disks and reconstructs missing data using the parity information if one of the first solid state disk and the second solid state disk fails.

6. The apparatus of claim 3, wherein the request to access the data block is a write request.

7. The apparatus of claim 6, wherein the processor accesses the data block in the cache volume by striping the data block across the plurality of solid state disks.

8. The apparatus of claim 6, wherein the processor accesses the data block in the cache volume by generating parity information for the data block and striping the data block and the parity information across the plurality of solid state disks.

9. The apparatus of claim 8, wherein the plurality of solid state disks comprises a plurality of data disks and a parity disk and wherein the processor stripes the data block and the parity information by striping the data block across the plurality of data disks and storing the parity information on the parity disk.

10. The apparatus of claim 6, wherein the processor accesses the data block in the cache volume by storing at least a portion of the data block on a first solid state disk in the plurality of solid state disks and mirroring the at least a portion of the data block on a second solid state disk in the plurality of solid stale disks.

11. The apparatus of claim 3, wherein the processor is embodied in a storage controller.

12. The apparatus of claim 11, wherein the plurality of solid state disks is connected to the storage controller through at least one drive channel.

13. A storage module comprising:
   a storage controller including a processor; and
   a plurality of solid state disks, coupled to the storage controller, wherein the plurality of solid state disks form a cache volume that serves as a storage controller cashe;
   wherein the storage controller has a plurality of modes of operation including:
      a first mode of operation in which the storage controller receives a request to read a data block to a storage device;
      a second mode of operation in which the storage controller attempts to read at least a portion of the data block from a first solid state disk in the plurality of solid state disks; and
      a third mode of operation, responsive to the first solid state disks failing, in which the storage controller reads the at least a portion of the data block from a second solid state disk in the plurality of solid state disks.

14. The storage module of claim 13, wherein the plurality of modes operation includes:
   a fourth mode of operation wherein, if one of the first solid state disk and the second solid state disk fails, parity information is read from a third solid state disk in the plurality of solid state disks; and
   a fifth mode of operation wherein missing data is reconstructed using the parity information.

15. A method for managing a cache in a computer system having a cache residing on a plurality of solid state disks, comprising:
   configuring the plurality of solid state disks to form a cache volume having stored therein a cache;
   receiving a request to access a data black at a storage device, wherein the request to access the data block is a write request;
   accessing the data block in the cache volume, wherein the step of accessing the data block in the cache volume comprises striping the data block across the plurality of solid state disks.

16. The method of claim 15, wherein the step of accessing the data block in the cache volume further comprises:

generating parity information for the data block; and striping the data block and the parity information across the plurality of solid state disks.

17. The method of claim 16, wherein the plurality of solid state disks comprises a plurality of data disks and a parity disk and wherein the step of striping the data block and the parity information comprises:

striping the data block across the plurality of data disks; and storing the parity information on the parity disk.

18. The method of claim 15, wherein the step of accessing the data block in the cache volume further comprises:

storing at least a portion of the data block on a first solid state disk in the plurality of solid state disks; and mirroring the at least a portion of the data block on a second solid state disk in the plurality of solid state disks.

19. The method of claim 15, wherein the method is performed by a storage controller.

20. The method of claim 19, wherein the plurality of solid state disks is connected to the storage controller through at least one drive channel.

21. A storage module comprising:

a storage controller including a processor; and a plurality of solid state disks, coupled to die storage controller, wherein the plurality of solid state disks form a cache volume that serves as a storage controller cache;

wherein the storage controller has a plurality of modes of operation including:

a first mode of operation in which the storage controller receives a request to write a data block to a storage device; and a second mode of operation in which the storage controller stripes the data block across the plurality of solid state disks.

22. The storage module of claim 21, wherein the plurality of modes of operation includes:

a third mode of operation in which the storage controller generates parity information for the data block; and a fourth mode of operation in which the storage controller stripes the data block and the parity information across the plurality of solid state disks.

23. The storage module of claim 21, wherein the plurality of modes of operation includes:

a third mode of operation in which the storage controller stores at least a portion of the data block on a first solid state disk in the plurality of solid state disks; and a fourth mode of operation in which the storage controller minors the at least a portion of the data block on a second solid state disk in the plurality of solid state disks.

* * * * *